United States Patent
Capriotti et al.

(10) Patent No.: US 9,943,920 B2
(45) Date of Patent: Apr. 17, 2018

(54) METHOD FOR ELECTRO-CHEMICAL MACHINING TURBINE WHEEL IN-SITU

(71) Applicant: General Electric Company, Schenectady, NY (US)

(72) Inventors: Daryl Paul Capriotti, Simpsonville, SC (US); John William Herbold, Fountain Inn, SC (US); James Bradford Holmes, Fountain Inn, SC (US); Michael Alan Smith, Easley, SC (US); Andrew Lee Trimmer, Niskayuna, NY (US)

(73) Assignee: General Electric Company, Schenectady, NY (US)

(*) Notice: Subject to any disclaimer, the term of this patent is extended or adjusted under 35 U.S.C. 154(b) by 266 days.

(21) Appl. No.: 14/671,365

(22) Filed: Mar. 27, 2015

(65) Prior Publication Data

US 2016/0279722 A1    Sep. 29, 2016

(51) Int. Cl.
*B23H 9/10* (2006.01)
*F01D 5/00* (2006.01)
(Continued)

(52) U.S. Cl.
CPC ............. *B23H 9/10* (2013.01); *B23H 3/04* (2013.01); *B23H 7/26* (2013.01); *F01D 5/005* (2013.01);
(Continued)

(58) Field of Classification Search
CPC ... B23H 3/04; B23H 7/26; B23H 9/10; B23H 9/02; F01D 25/285; F01D 5/005; F01D 5/3007; F05D 2230/11; F05D 2230/80
See application file for complete search history.

(56) References Cited

U.S. PATENT DOCUMENTS 3,972,797 A    8/1976   Hagen et al.
4,100,388 A    7/1978   Meyer
(Continued)

FOREIGN PATENT DOCUMENTS

DE              19938569 A1    4/2001
DE       10 2008 000 480 A1    9/2009
(Continued)

OTHER PUBLICATIONS

Tsunatani et al. (JPH07204935, machine translation).*
(Continued)

*Primary Examiner* — Susan D Leong
*Assistant Examiner* — Joshua L Allen
(74) *Attorney, Agent, or Firm* — Ernest Cusick; Hoffman Warnick LLC

(57) ABSTRACT

A method for electro-chemical machining (ECM) is provided. Methods may include providing an ECM machine including a controller and a fixture configured for positioning an electrode for ECM, positioning the fixture in a selected dovetail slot of a plurality of dovetail slots in a turbine wheel, the turbine wheel being positioned in-situ in a turbomachine, the fixture positioning the electrode for ECM of a portion of the selected dovetail slot, applying an electrolyte solution between the selected dovetail slot and the electrode, and removing material from the portion of the selected dovetail slot by applying an electric potential to the electrode to create a potential gradient between the electrode and the portion of the selected dovetail slot. The machining may be repeated for each dovetail slot of the turbine wheel in-situ in the turbomachine.

11 Claims, 11 Drawing Sheets

(51) Int. Cl.
*B23H 3/04* (2006.01)
*B23H 7/26* (2006.01)
*F01D 5/30* (2006.01)
*F01D 25/28* (2006.01)

(52) U.S. Cl.
CPC .......... *F01D 5/3007* (2013.01); *F01D 25/285* (2013.01); *F05D 2230/11* (2013.01); *F05D 2230/80* (2013.01)

(56) References Cited

U.S. PATENT DOCUMENTS

| | | | |
|---|---|---|---|
| 4,256,555 | A | 3/1981 | Wilson et al. |
| 4,468,304 | A | 8/1984 | Hill |
| 4,761,104 | A | 8/1988 | Hillestad |
| 5,101,557 | A | 4/1992 | Mueller et al. |
| 5,149,405 | A | 9/1992 | Bruns et al. |
| 5,161,291 | A | 11/1992 | Guenther |
| 5,284,406 | A | 2/1994 | Mueller et al. |
| 5,527,435 | A | 6/1996 | Arnau |
| 5,533,845 | A | 7/1996 | Glover |
| 6,290,461 | B1 | 9/2001 | Wei et al. |
| 6,296,172 | B1 | 10/2001 | Miller |
| 6,419,426 | B1 | 7/2002 | Chalupa et al. |
| 6,551,032 | B1 | 4/2003 | Nolan et al. |
| 6,652,369 | B2 | 11/2003 | Jones et al. |
| 6,767,168 | B2 | 7/2004 | Miller |
| 6,830,240 | B2 | 12/2004 | Jones et al. |
| 6,844,518 | B1 | 1/2005 | Coons et al. |
| 6,846,227 | B2 | 1/2005 | Sato et al. |
| 7,211,178 | B2 | 5/2007 | Schreiber |
| 7,309,215 | B2 | 12/2007 | Negulescu |
| 7,476,085 | B2 | 1/2009 | Mohr et al. |
| 7,699,685 | B1 | 4/2010 | Gerstner |
| 7,938,951 | B2 | 5/2011 | Lee et al. |
| 8,016,565 | B2 | 9/2011 | Berg et al. |
| 8,034,228 | B2 | 10/2011 | Bayer et al. |
| 8,151,458 | B2 | 4/2012 | Hlavaty et al. |
| 8,161,641 | B2 | 4/2012 | Lamphere et al. |
| 8,187,451 | B2 | 5/2012 | Bayer et al. |
| 8,262,897 | B2 | 9/2012 | Bayer et al. |
| 8,291,557 | B2 | 10/2012 | Powers et al. |
| 8,402,625 | B2 | 3/2013 | Holmes et al. |
| 8,540,861 | B2 | 9/2013 | Bayer et al. |
| 8,713,775 | B2 | 5/2014 | Zhang et al. |
| 8,778,147 | B2 | 7/2014 | Wei et al. |
| 8,906,221 | B2 * | 12/2014 | Holmes .................. B23H 5/08 205/662 |
| 9,162,301 | B2 * | 10/2015 | Holmes .................. B23H 3/04 |
| 2006/0156544 | A1 | 7/2006 | Sherlock et al. |
| 2007/0158389 | A1 | 7/2007 | Rose |
| 2008/0058982 | A1 | 3/2008 | Gray |
| 2012/0269592 | A1 | 10/2012 | Holmes et al. |
| 2013/0167337 | A1 | 7/2013 | Dupouy et al. |
| 2014/0008241 | A1 * | 1/2014 | Gunther .................. B23H 7/28 205/645 |
| 2014/0034512 | A1 * | 2/2014 | Holmes .................. B23H 5/08 205/663 |
| 2014/0034513 | A1 * | 2/2014 | Holmes .................. B23H 3/04 205/668 |
| 2014/0223709 | A1 | 8/2014 | Clark et al. |
| 2015/0273602 | A1 | 10/2015 | Mukai et al. |

FOREIGN PATENT DOCUMENTS

| | | |
|---|---|---|
| GB | 2 442 449 | 4/2008 |
| JP | S60-48216 A | 3/1985 |
| JP | 07204935 A * | 8/1995 |
| JP | H07-204935 | 8/1995 |
| JP | H07204935 A | 8/1995 |
| JP | H07266118 A | 10/1995 |

OTHER PUBLICATIONS

U.S. Appl. No. 14/671,330, filed Mar. 27, 2015, Capriotti et al.
U.S. Appl. No. 14/671,293, filed Mar. 27, 2015, Capriotti et al.
Extended European Search Report and Opinion issued in connection with related EP Application No. 16161973.9 dated Aug. 19, 2016.
Non-Final Rejection towards related U.S. Appl. No. 14/671,293 dated Sep. 9, 2016.
U.S. Appl. No. 14/671,330, Office Action 1 dated May 19, 2017, 33 pages.

\* cited by examiner

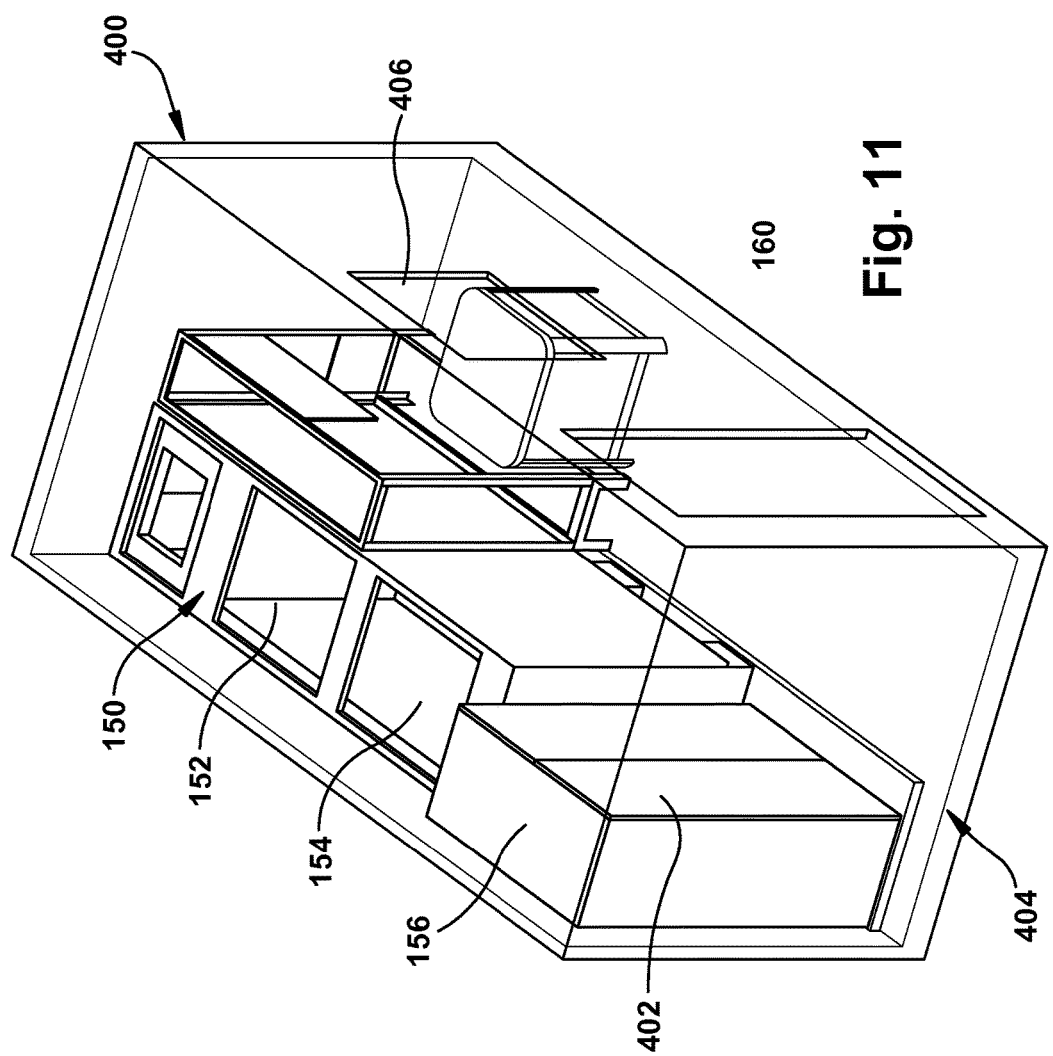

METHOD FOR ELECTRO-CHEMICAL MACHINING TURBINE WHEEL IN-SITU

CROSS-REFERENCE TO RELATED APPLICATIONS

This application is related to co-pending U.S. application Ser. No. 14/671,330, filed on Mar. 27, 2015.

BACKGROUND OF THE INVENTION

The present invention generally relates to electro-chemical machining (ECM). More particularly, this invention relates to a method of performing ECM in-situ of a portion of a dovetail slot, for example, edge regions of slots within turbine wheels employed in turbomachines, including but not limited to gas turbines used in power generation.

In the hostile operating environments of gas turbine engines, the structural integrity of turbine rotor wheels, buckets, and other components within their turbine sections is of great importance in view of the high mechanical stresses that the components must be able to continuously withstand at high temperatures. For example, the regions of a turbine wheel forming slots into which the buckets are secured, typically in the form of what are known as dovetail slots, are known to eventually form cracks over time, necessitating monitoring of the wheel in these regions. In some wheel configurations, non-limiting examples of which include the stage 1, 2, and 3 wheels of the General Electric 9FB gas turbine, cooling of the buckets and wheel perimeter is assisted by the presence of a cooling slot located near the perimeter of the wheel and into which the dovetail slots extend. Over extended periods of time under the severe operating conditions of a wheel, cracks may form at common edges formed where the dovetail slots and cooling slot intersect. Configuring of the cooling slot geometry to reduce the likelihood of such cracks is desirable in order to improve expected life of a turbine wheel.

While a turbine rotor can be completely disassembled to gain access to its individual wheels, ECM techniques that can be performed with limited disassembly are preferred to minimize downtime, such as to fit within outage schedules of a gas turbine employed in the power generating industry. However, access to the cooling slot is very limited, and any ECM technique must address the difficulty of bringing the tool into stable proximity to the edges being rounded.

Currently, cooling slots of gas turbine engines are generally rounded by mechanical grinding followed by a finishing process, such as BPP (blend, polish, peen). These methods involve using a bit to remove material at the edge of the cooling slot and then blending and/or polishing the edges to obtain the desired radius of the intersection edges. However, a desired radius is often difficult to achieve if the grinding was performed by mechanical means. Furthermore, BPP methods may fail to remove all of the cracks in the cooling slots.

Therefore, it would be desirable if a method existed by which sharp edges prone to cracks on a turbine wheel, particularly edge regions of slots within the wheel, could be rounded to a desired radius with minimal polishing and/or blending using ECM. It would also be desirable if such a process were able to be performed without necessitating complete disassembly of a turbine rotor to gain access to its individual wheels.

BRIEF DESCRIPTION OF THE INVENTION

A first aspect of the disclosure provides a fixture for an electro-chemical machining (ECM) electrode, comprising: a clamp having a shape and size configured to selectively engage in at least a portion of a selected dovetail slot of a plurality of dovetail slots in a turbine wheel; and an electrode mount for positioning an electrode head relative to the clamp such that the electrode head operatively engages a portion of the selected dovetail slot for electro-chemical machining of the portion.

A second aspect of the disclosure provides a portable electro-chemical machining (ECM) cathode for a portion of a selected dovetail slot of a turbine wheel having a plurality of dovetail slots, the ECM cathode comprising: a cathode body including a cathode head; a clamp having a shape and size configured to selectively engage in at least a portion of the selected dovetail slot; and a cathode mount for positioning the cathode head relative to the clamp such that the cathode head operatively engages the portion of the selected dovetail slot for electro-chemical machining of the portion.

A third aspect includes a method for electro-chemical machining (ECM), comprising: providing an ECM machine including a controller and a fixture configured for positioning an electrode for ECM; positioning the fixture in a selected dovetail slot of a plurality of dovetail slots in a turbine wheel, the turbine wheel being positioned in-situ in a turbomachine, the fixture positioning the electrode for ECM of a portion of the selected dovetail slot; applying an electrolyte solution between the selected dovetail slot and the electrode; and removing material from the portion of the selected dovetail slot by applying an electric potential to the electrode to create a potential gradient between the electrode and the portion of the selected dovetail slot.

The illustrative aspects of the present disclosure are configured to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which:

FIG. 11 shows a perspective view of a portable ECM shipping container according to embodiments of the invention.

It is noted that the drawings of the disclosure are not to scale. The drawings are intended to depict only typical aspects of the disclosure, and therefore should not be considered as limiting the scope of the disclosure. In the drawings, like numbering represents like elements between the drawings.

DETAILED DESCRIPTION OF THE INVENTION

The present invention will be described in terms of fixture 200 (FIG. 5) for an ECM electrode and fixture of an ECM cathode 300 (FIG. 5) for machining at least a portion of a dovetail slot, for example, to repair the geometry of high stress edge regions thereof that are prone to cracking. Related methods of operation will also be described. While various applications are foreseeable and possible, applications of particular interest include difficult to access regions of components of gas turbines, including land-based gas turbine engines. Of more particular interest are turbine wheels having axial dovetail slots along a perimeter thereof that are configured for mating with and securing airfoil members to the perimeter of the wheel, and an annular cooling slot that intersects the axial dovetail slots. In this case, the portion of the dovetail slot may include an edge of the cooling slot within the dovetail slot.

Figure 1:
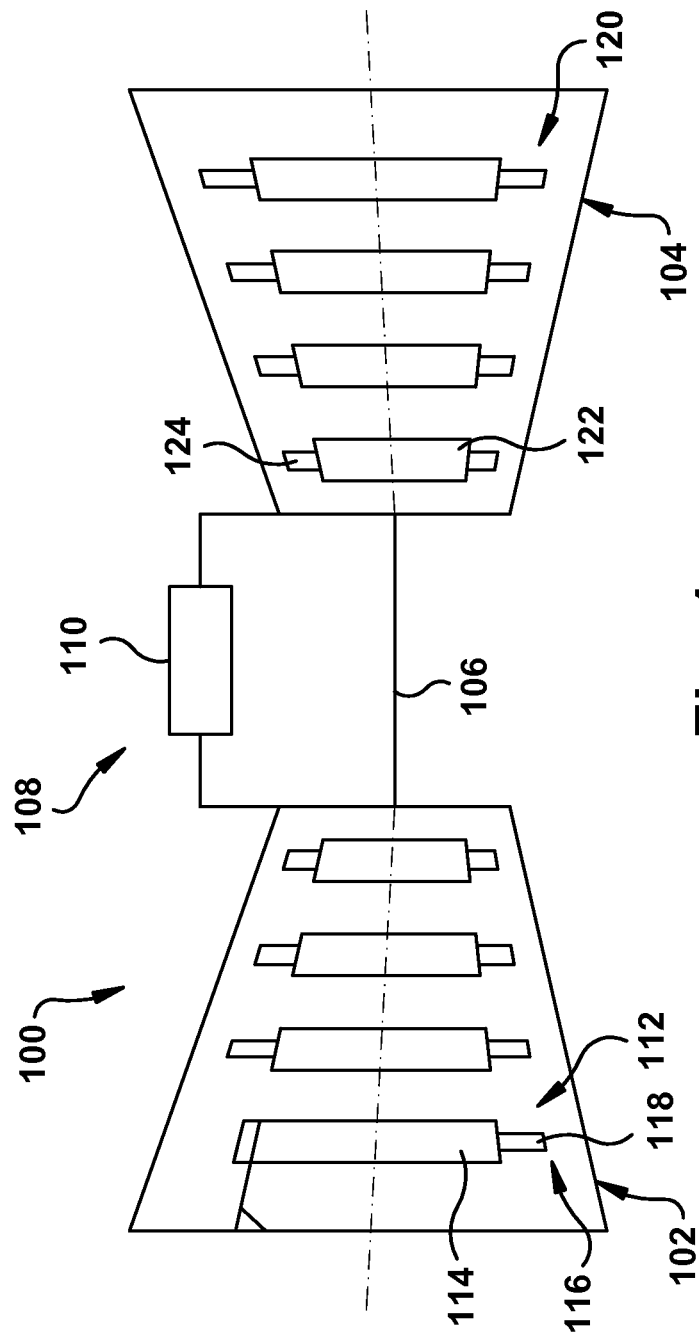
FIG. 1 shows a schematic view of a turbomachine.

As indicated above, the disclosure provides a fixture for an ECM electrode for a portion of a dovetail slot in a turbine wheel of a turbomachine. FIG. 1 shows a turbomachine 100 that includes a compressor portion 102 operatively coupled to a turbine portion 104 through a common compressor/turbine shaft 106. Compressor portion 102 is also fluidically connected to turbine portion 104 through a combustor assembly 108. Combustor assembly 108 includes one or more combustors 110. Combustors 110 may be mounted to turbomachine 100 in a wide range of configurations including, but not limited to, being arranged in a can-annular array. Compressor portion 102 includes a plurality of compressor rotor wheels 112. Rotor wheels 112 include a first stage compressor rotor wheel 114 having a plurality of first stage compressor rotor blades 116 each having an associated airfoil portion 118. Similarly, turbine portion 104 includes a plurality of turbine rotor wheels 120 (hereafter "turbine wheels") including a first stage turbine wheel 122 having a plurality of first stage turbine rotor blades 124. In accordance with an exemplary embodiment, a fixture 200 for an ECM electrode 202 (FIG. 5) may be provided for mounting to, for example, first stage turbine wheel 122. It will be understood, however, ECM fixture 200 may be positioned to machine any turbine wheel of turbomachine 100.

Figure 2:
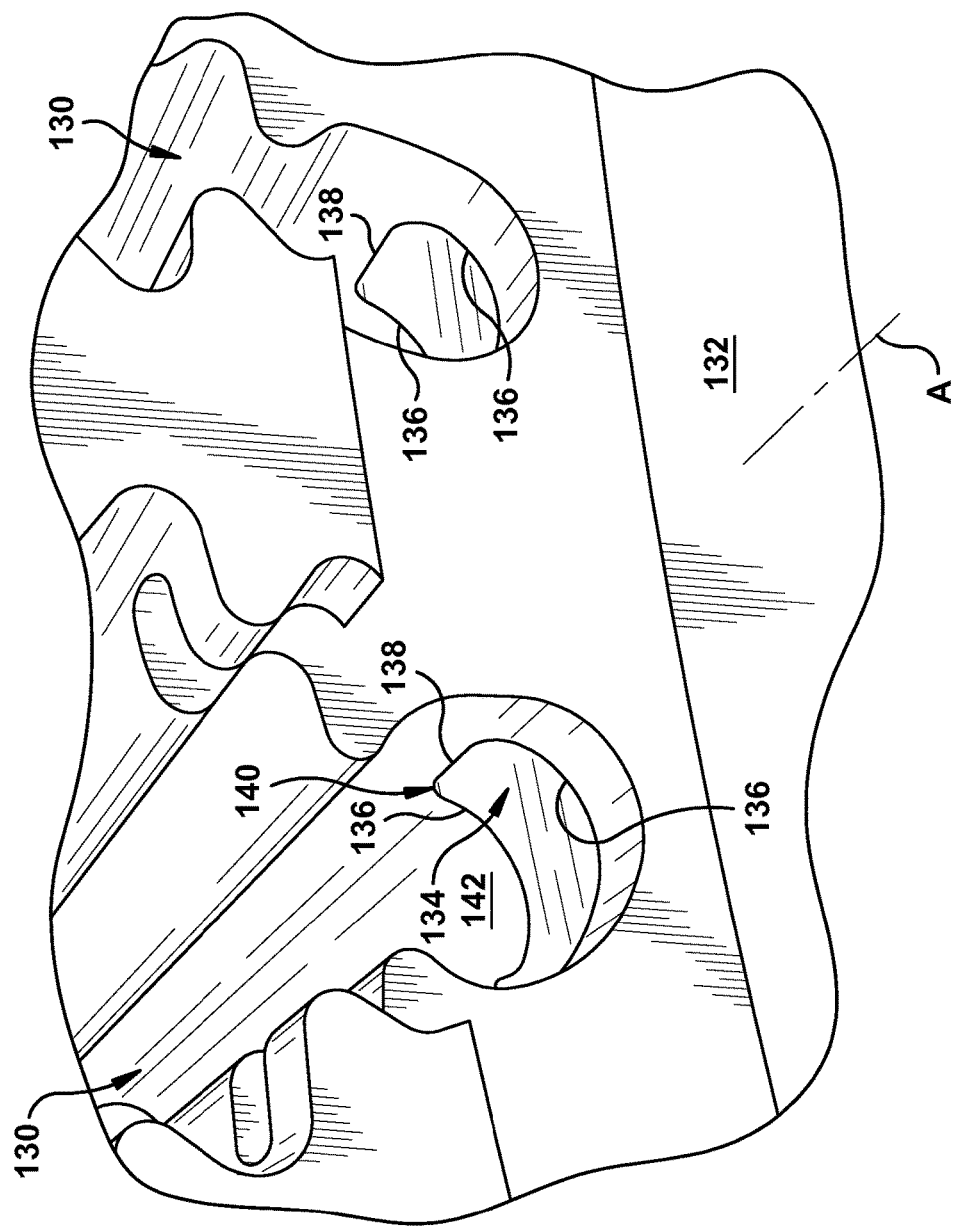
FIG. 2 shows an end perspective view of a dovetail slot prior to ECM using the fixture according to embodiments of the invention.
Figure 3:
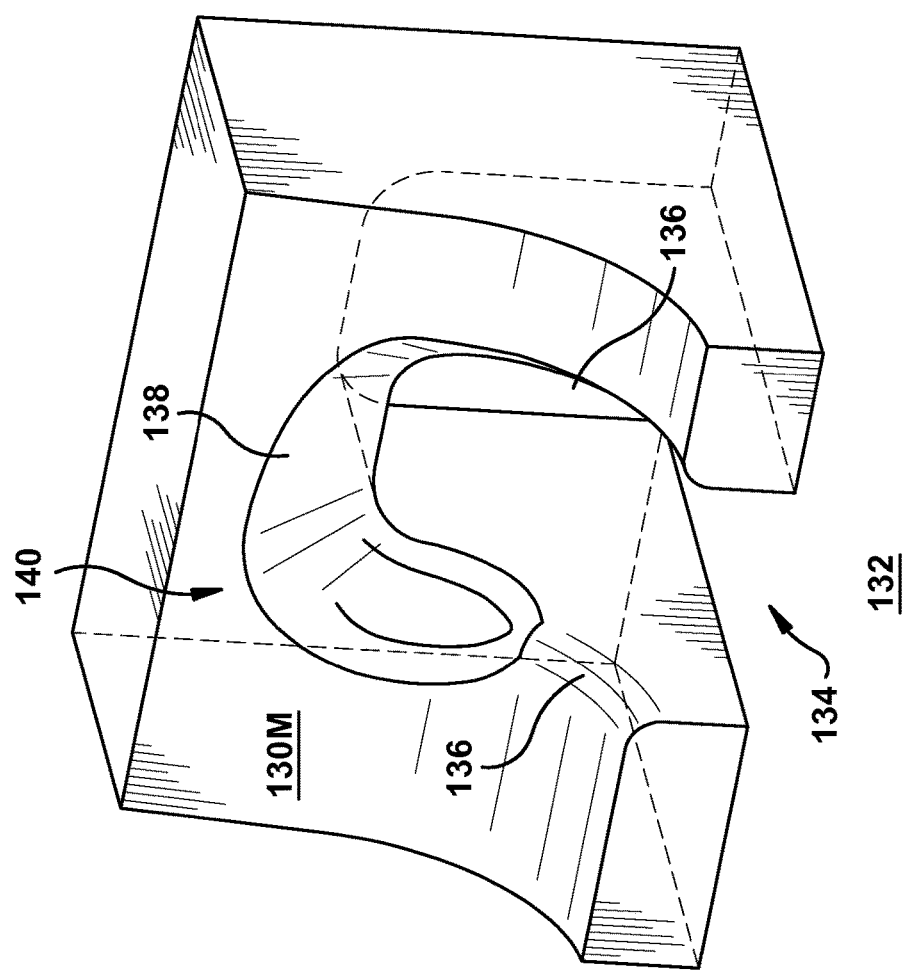
FIG. 3 shows an end perspective view of the dovetail slot of FIG. 2 after machining.

A fragmentary view of a turbine wheel is represented in FIGS. 2-3 and will serve as an example in the following discussion. As shown in FIG. 2, a pair of dovetail slots 130 in a turbine wheel 132 amongst a plurality of dovetail slots in the turbine wheel are illustrated. Dovetail slots 130 may be located in any wheel of turbomachine 100. As understood, dovetail slots 130 are circumferentially spaced about the turbine wheel. Each dovetail slot 130 may take the form of any blade-to-rotor mounting element now known or later developed. In the examples illustrated, dovetail slot 130 includes a complex 'tree' configuration; however, simpler arrangements are possible. For example, dovetail slots 130 may have substantially triangular cross-sections. FIG. 2 depicts two dovetail slots 130 of turbine wheel 132, which is representative of the type conventionally used in gas turbine engines such as those used in the power generation industry. An annular cooling slot 134 intersects axial dovetail slots 130. Cooling slot 134 comprises side edges 136 and radially-outward edges 138. Collectively, edges 136, 138 form an edge 140 of cooling slot 134 within dovetail slot 130, i.e., a slot within a slot. If edges 136 and 138 are sufficiently sharp, cracking can occur in regions of cooling slot 134. As an example, cracking has been observed to occur near the intersection of aft side edge 136 and radially-outward edge 138 looking downstream of a gas turbine engine (into page as illustrated). Removing turbine wheel 132 from the machine for the purpose of repairing the geometries of these edges 136 and 138 is a long-lead, high-cost operation.

Fixture 200 (FIG. 5) described herein provides a means of repairing the geometry of turbine wheel 132 in-situ in the case-off condition to reduce stress concentrations, for example, attributable to the geometries of edge 140, e.g., portions of cooling slot edges 136 and 138. As understood, ECM includes applying an AC or DC potential between an electrode and the structure to be machined, a current is induced and an electrolyte-based material removal process occurs at the conductive workpiece (i.e., anode) when the electrode (i.e., cathode) is negatively charged in the presence of a conductive fluid (electrolyte solution). Fixture 200 (FIG. 5) may be used to provide an intermediate finishing process used in conjunction with other milling and grinding tools, such as a milling head or an electrochemical chemical grinding (ECG) tool, that are initially used to remove a portion of the dovetail slot, e.g., an edge of the cooling slot 136 (FIGS. 2-3) within dovetail slot 130. Fixture 200 (FIG. 5) may be employed to continue removing any damaged material and simultaneously rounding mating surfaces that form edges 136 and 138 to an improved finishing texture compared to milling or grinding processes. Peening may be used in a follow-on operation to apply a surface compression layer. Although the teachings of the invention will be described relative to the particular setting of revising a portion of dovetail slot 130 (FIG. 3) in the form of an edge of cooling slot 134 within dovetail slot 130, it is emphasized that fixture 200 and the teachings of the invention may be employed for a large number of other portions within dovetail slots 130 and turbine wheel 132. For example, other portions of dovetail slot 130 may include portions of the dovetail, a root portion of the dovetail slot, etc.

Figure 4:
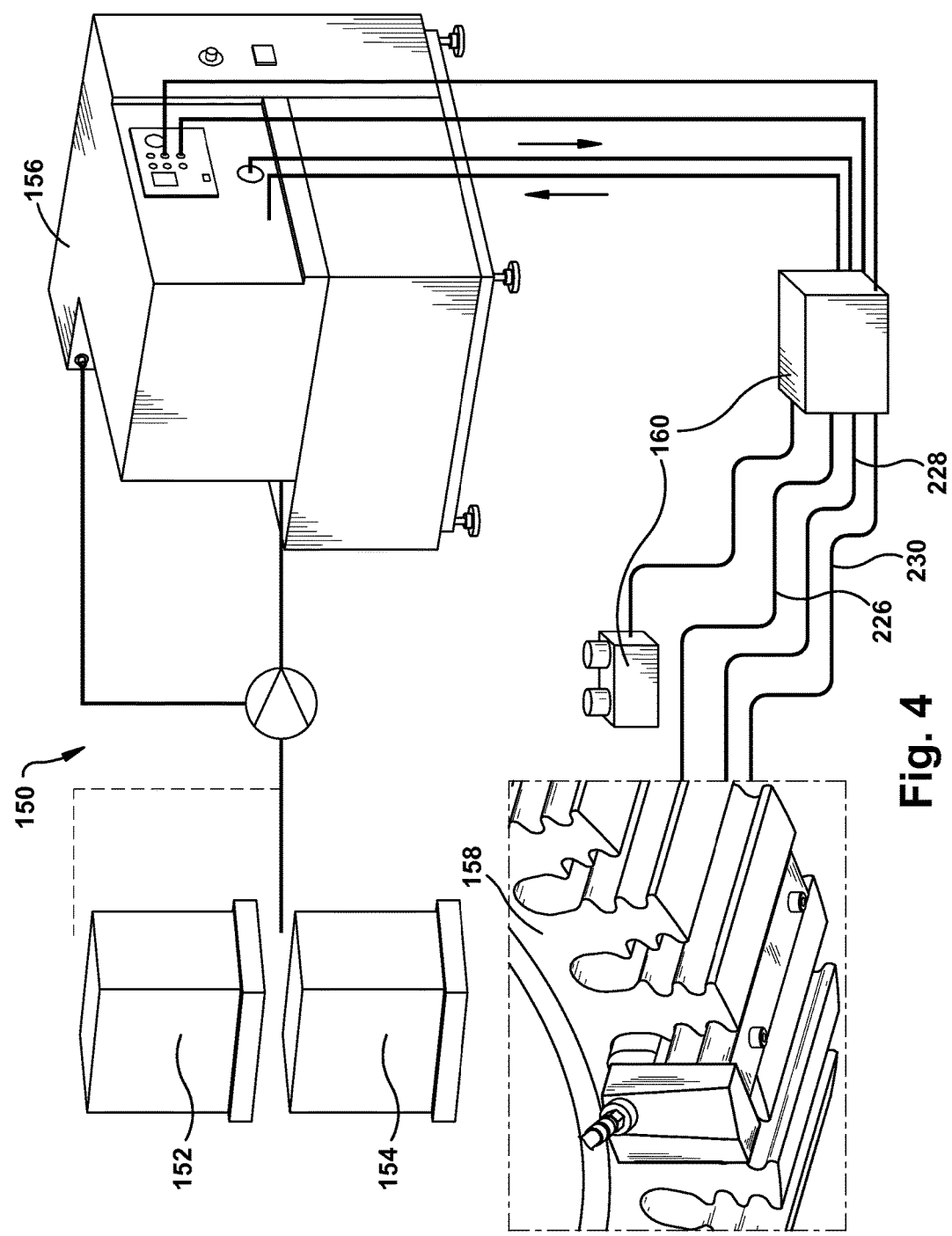
FIG. 4 shows a schematic view of an ECM machine employing a fixture for an ECM electrode according to embodiments of the invention.

Referring to FIG. 4, a schematic view of an illustrative ECM machine 150 employing a fixture 200 (FIG. 5) according to embodiments of the invention is shown. ECM machine 150 may include an electrolyte solution source 152 and electrolyte solution collector 154 for storing liquid electrolyte prior to and after machining. The electrolyte solution may take any form now known or later developed for electro-chemical machining. Source and collector 152, 154 may include any form of storage compartment, e.g., plastic or metal tanks ECM machine 150 also includes an ECM control 156 configured to control electric charge supplied to ECM electrodes engaging a workpiece 158, e.g., turbine wheel 132 (FIG. 3). In one embodiment, workpiece 158 is charged as the anode and fixture 200 is configured to position a cathode, as will be described herein. ECM control 156 may include any now known or later developed electrochemical machining control system. As understood in the art, ECM control 156 controls a number of attributes such as but not limited to: pump and heater functioning to control a flow rate, pressure, temperature, etc., of an electrolyte solution delivered to workpiece 158, the electric charge delivered to the electrodes, etc. ECM machine 150 may optionally include a remote control 160 for, for example, remote start/stop of machining. In one embodiment, ECM machine 150 is configured to be portable. For example, all of the parts of ECM machine 150 may be configured and sized to be carried within a standard shipping container. In this manner, ECM machine 150 can be employed in the field and moved from location to location to service various turbomachines.

Figure 5:
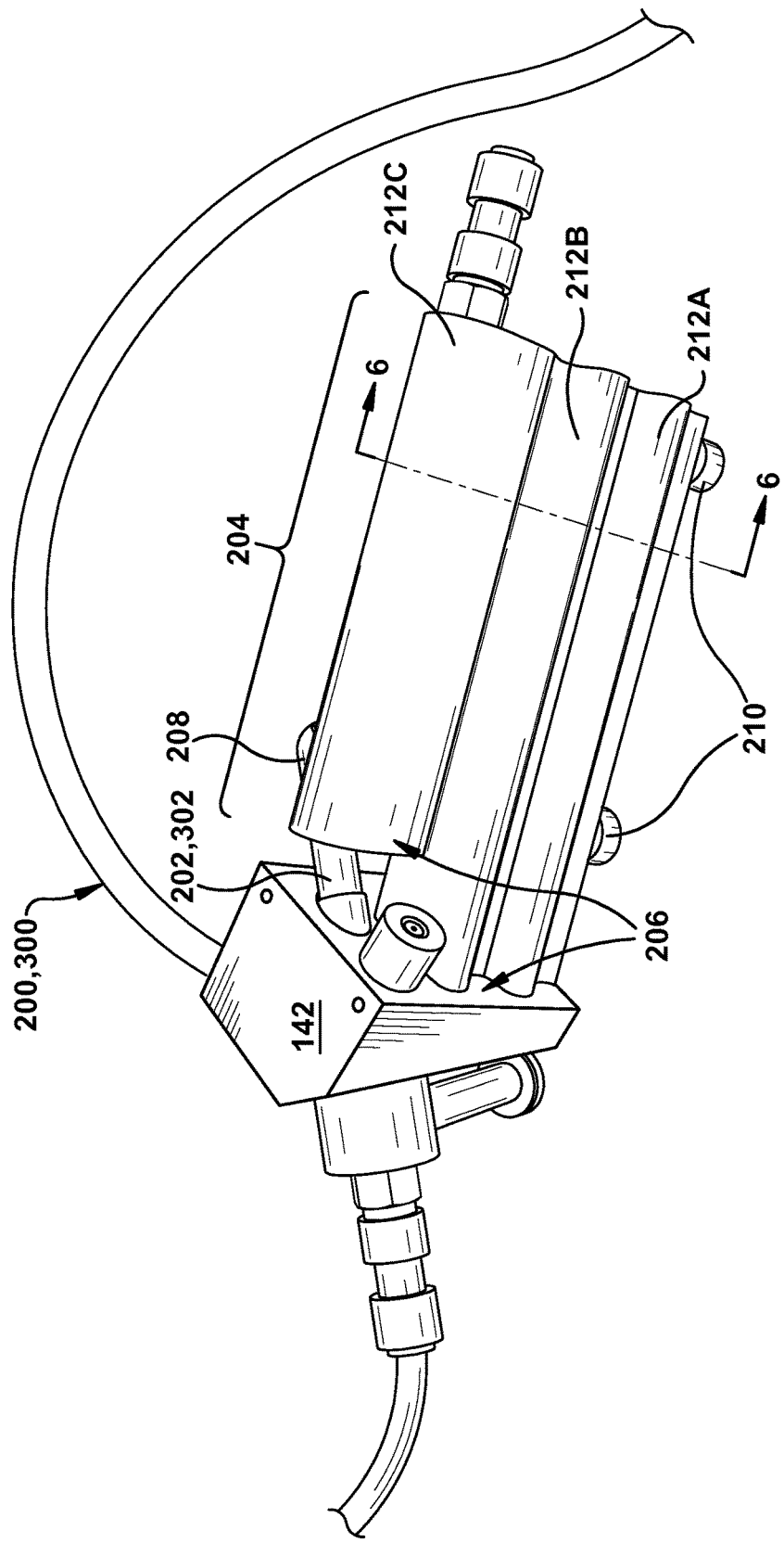
FIG. 5 shows a side perspective view of a fixture for an ECM electrode according to embodiments of the invention.

Referring to FIG. 5, a perspective view of one embodiment of a fixture 200 for an electrode 202 of an ECM machine electrode is illustrated. Fixture 200 may include a clamp 204 having a shape and size configured to selectively engage in at least a portion of a selected dovetail slot 130 (FIG. 2) of a plurality of dovetail slots in turbine wheel 132 (FIG. 2). In addition, fixture 200 may include an electrode mount 206 for positioning an electrode head 208 relative to the clamp such that electrode head 208 operatively engages a portion of the selected dovetail slot 130 for electrochemical machining of the portion.

Figure 6:
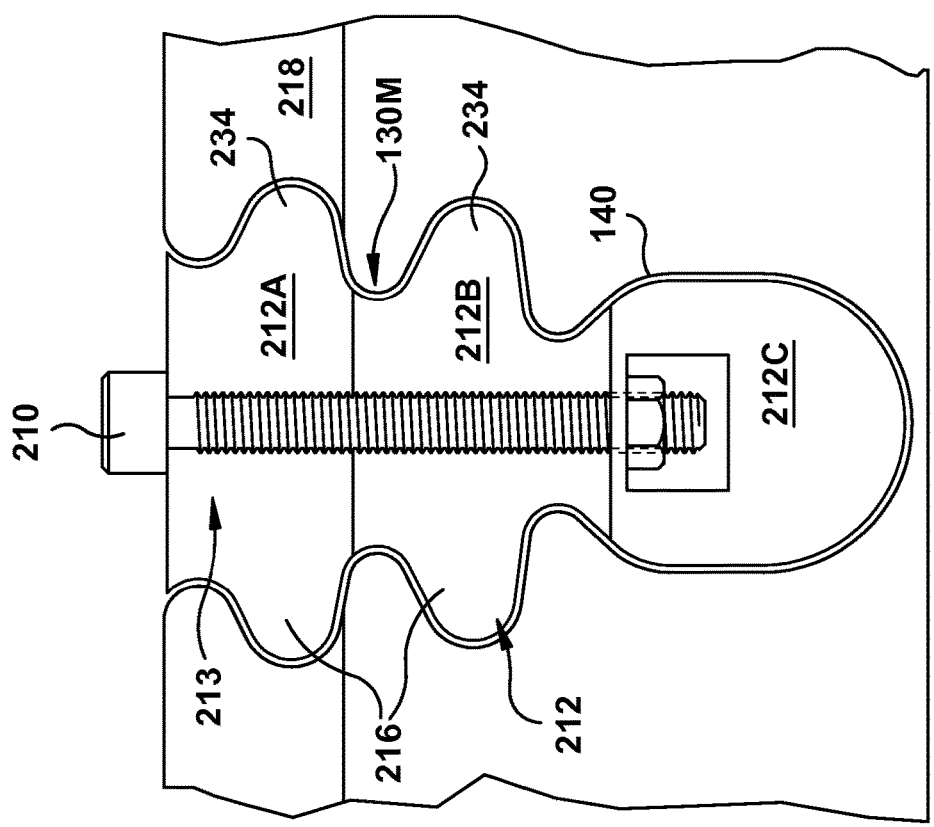
FIG. 6 shows a cross-sectional view of a clamp of the fixture along line 6-6 of FIG. 5 while positioned within a selected dovetail slot.

Referring to FIGS. 5 and 6, details of an illustrative clamp 204 will now be described. FIG. 6 shows an enlarged cross-sectional view along 6-6 in FIG. 5 of clamp 204 in a selected dovetail slot 130M. Although a particular form of a clamp will be described relative to FIGS. 5 and 6, the clamp may include any structure having a shape and size configured to selectively engage in at least a portion of a selected dovetail slot 130M (FIG. 6) to hold electrode 202 relative to the slot. As illustrated in FIGS. 5 and 6, in one embodiment, clamp 204 includes an adjustable member 210 to allow selective securing and removal of the clamp from selected dovetail slot 130M (FIG. 6). Adjustable member 210 may include any adjustable member capable of selectively securing the rest of clamp 204 within selected mounting dovetail slot 130M (FIG. 6) in turbine wheel 132. For example, clamp 204 may also include a plurality of longitudinal clamping member(s) 212A, 212B and/or 212C. Adjustable member 210 adjustably radially displaces at least one of the plurality of longitudinal clamping members 212A, 212B, 212C, i.e., radially relative to selected dovetail slot 130M, to secure the clamp in selected dovetail slot 130M. While FIGS. 5 and 6 show three (3) longitudinal clamping members 212A, 212B, 212C, it is understood that two or more than three segments may also be employed depending, for example, on selected dovetail slot's 130M cross-sectional shape and size. In any event, set of adjustable clamping members 212A-C collectively have a cross-sectional shape to approximately conform with at least a portion of selected dovetail slot 130M. That is, an outer perimeter of members 212A-C may approximately conform to at least a portion of the interior surface of selected dovetail slot 130M so that when the clamp is axially slid into dovetail slot 130M, at least a portion of the clamp engages with the interior surface of selected dovetail slot 130M to hold the clamp 204 in position relative to selected dovetail slot 130M. In the example shown, selected dovetail slot 130M has a 'tree' dovetail configuration, and accordingly, members 212A-C collectively have an at least similar 'tree' dovetail configuration. Clamp 204 may additionally include, for example, one or more projections 216 that engage with the interior surface of selected dovetail slot 130M when members 212A-C are tightened together with adjustable member 210. Adjustable member 210 may include, for example, one or more set screws, each with a nut seated within an outermost member 212C. Other adjustable members 210 may also be employed such as but not limited to screws threaded into members 212A-C, adhesives, clamps on the ends of members 212A-C, etc. In any event, adjustment of adjustable member 210 may force the one or more projections 216 against an inclined surface(s) (adjacent projections 216) inside selected dovetail slot 130M to engage projections 216 therewith, thus binding clamp 204 to selected dovetail slot 130M and thus preventing movement of electrode 202 (FIG. 5), as will be described. Additional suitable structures for clamping to selected dovetail slot 130M may include, for example, a vice, spanner, jack, or other equivalent mechanical device connected to electrode mount 206. Clamping members 212A, 212B, 212C may be made of an insulator material such as but not limited to a hard plastic such as nylon or polytetrafluoroethylene (PTFE). Adjustable member(s) 210 may also be made out of an insulator material, but could be other materials such as a metal.

Figure 7:
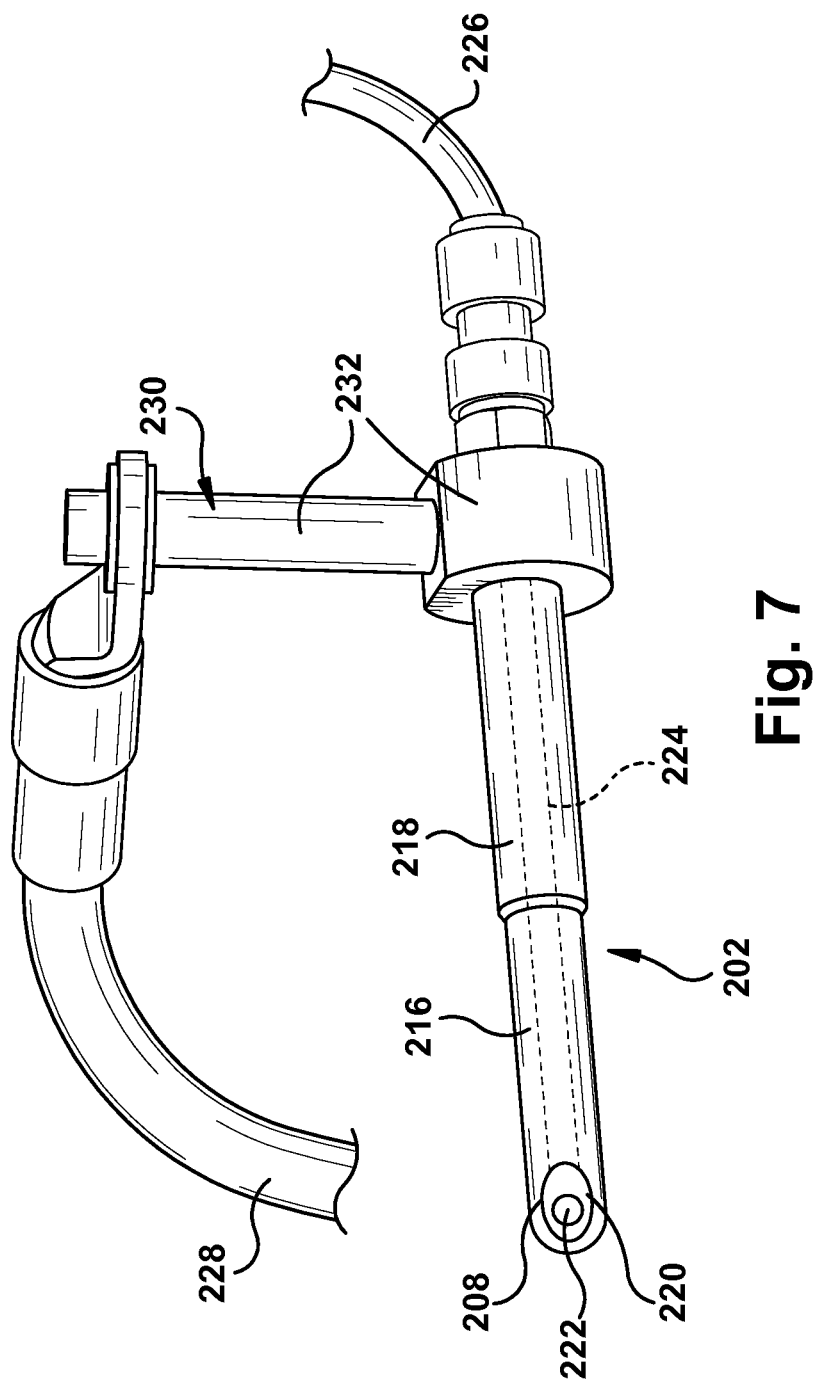
FIG. 7 shows a side perspective view of an illustrative cathode for use the fixture of FIG. 5.
Figure 8:
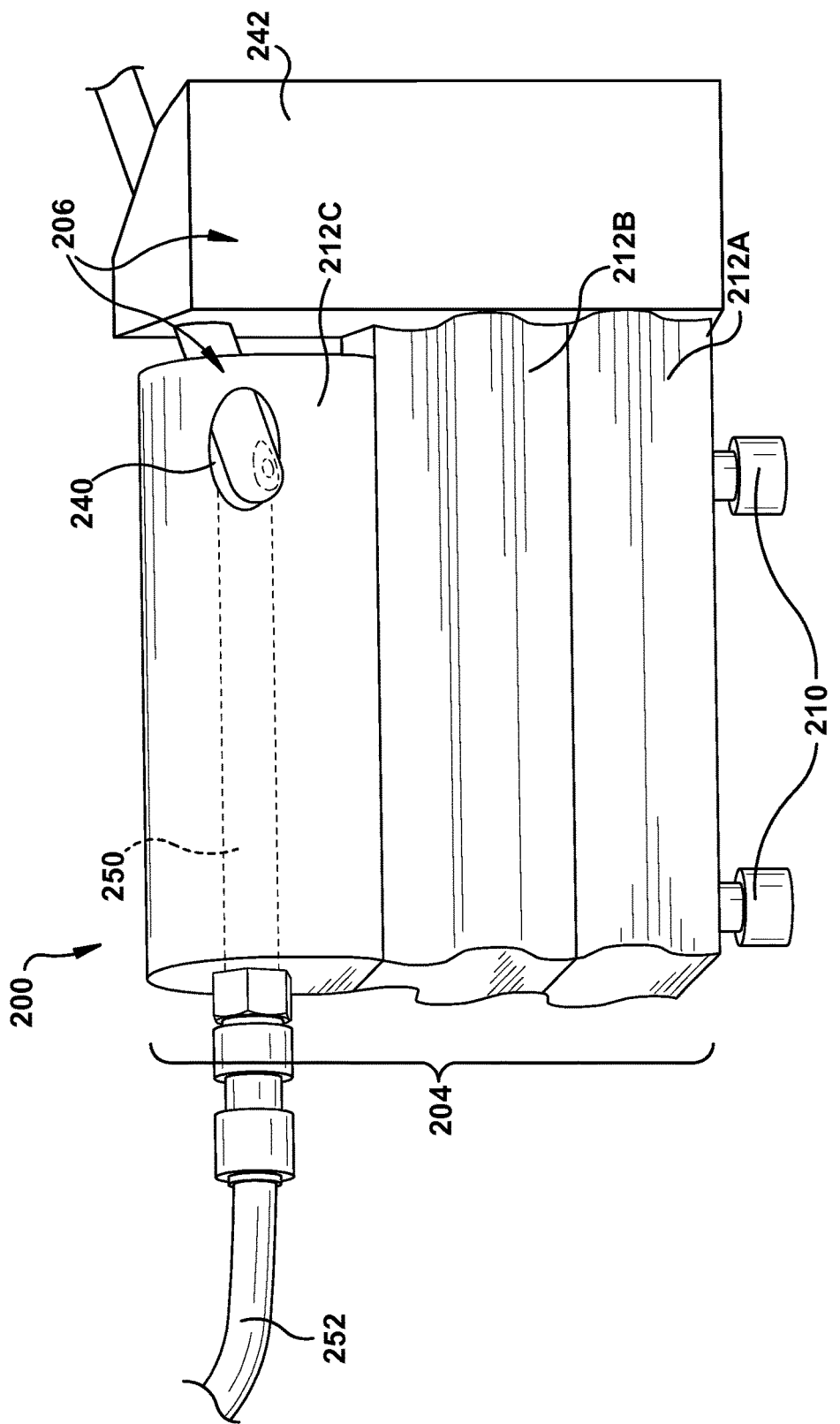
FIG. 8 shows a side perspective view of the fixture of FIG. 5 with the ECM electrode removed.
Figure 9:
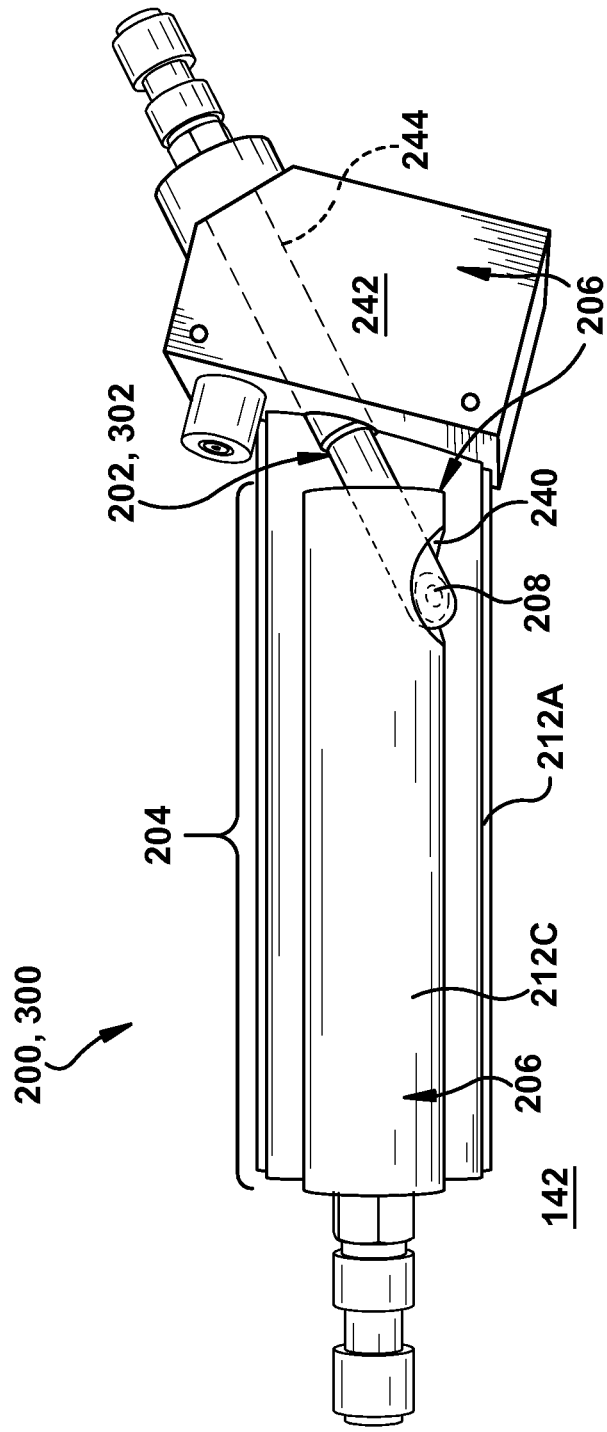
FIG. 9 shows a top perspective view of the fixture of FIG. 5.
Figure 10:
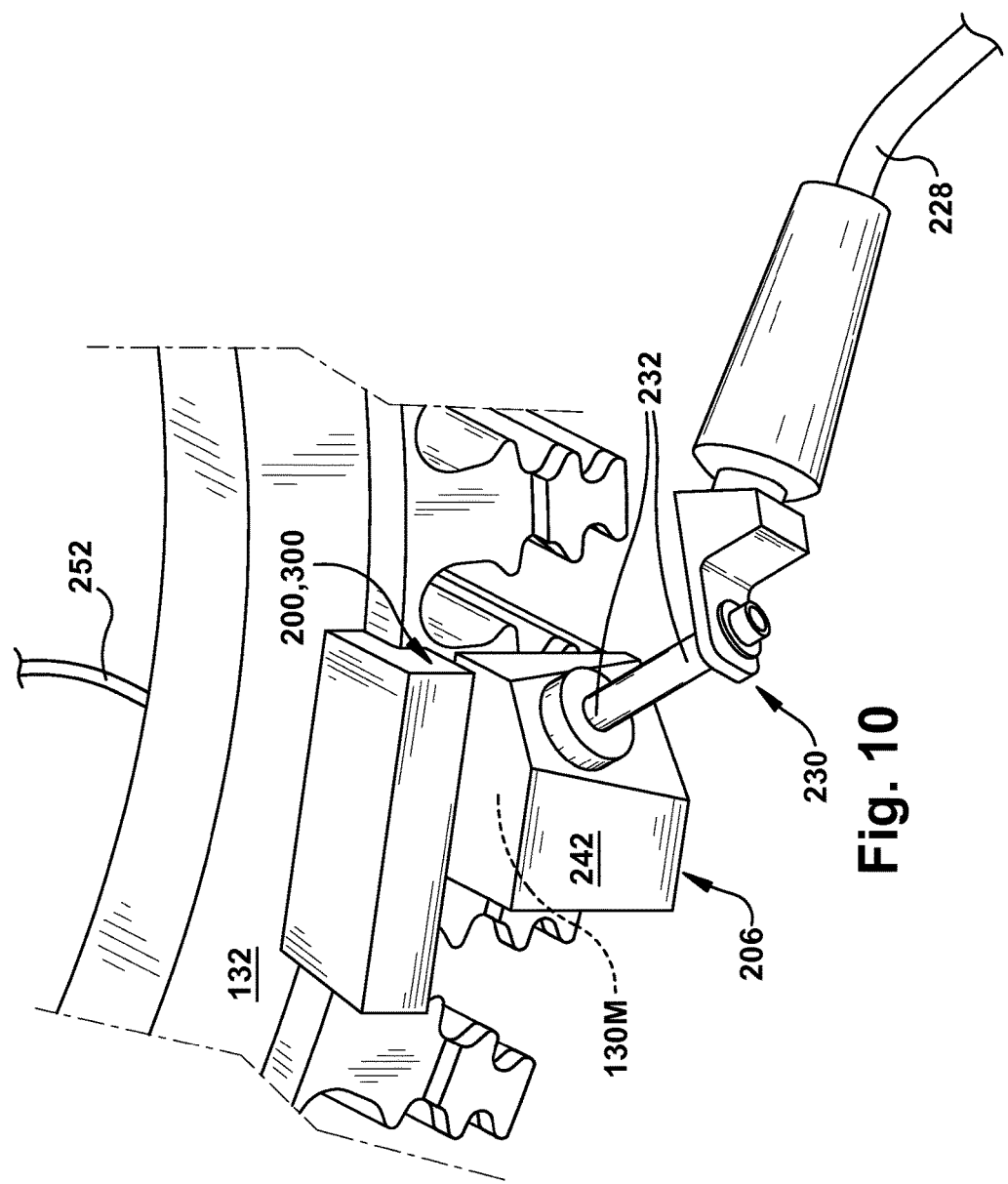
FIG. 10 shows a perspective view of the fixture of FIG. 5 in position to perform ECM on a dovetail slot.

Referring to FIGS. 5 and 7-10, details of an example electrode 202 and electrode mount 206 for positioning electrode head 208 of electrode 202 relative to clamp 204 will now be described. FIG. 7 shows a side perspective view of an illustrative electrode 202 separate from electrode mount 206, FIG. 8 shows a side perspective view of fixture 200 and electrode mount 206 without an electrode, FIG. 9 shows a plan view of fixture 200 with electrode mount 206 and electrode 202, and FIG. 10 shows fixture 200 in position with a dovetail slot 130M to perform ECM.

Referring to FIG. 7, one embodiment of electrode 202 is illustrated. It is emphasized that while electrode 202 will be described herein as a particular shape and size, it may take various forms within the scope of the invention. In any event, electrode 202 includes a conductive body 216 having an insulator 218 covering the electrode except at an exposed portion 220 of electrode head 208, where conductive body 216 is exposed for machining. Conductive body 216 may include any conventional or later developed conductive material used for ECM such as but not limited to steel, nickel, brass, copper, tungsten, copper tungsten alloy, titanium, etc. As understood, electrode head 208 and, in particular, exposed portion 220 have the shape and size of the feature, attribute to be machined into the workpiece, e.g., turbine wheel 132 (FIG. 3). Electrode 202 may also include electrode head 208 having an opening 222 at an end thereof, which may be in fluid communication with an electrolyte solution passage 224 extending through electrode 208. As shown in FIG. 7, electrolyte solution passage 224 (shown in phantom) may be in fluid communication, via a conduit 226, with an electrolyte solution source 152 (FIG. 4) via ECM control 156 (FIG. 4). In addition thereto or as an alternative, as shown best in FIG. 8, clamp 204 may include an electrolyte solution passage 250 extending through the clamp and terminating adjacent to electrode head 208. Passage 250 may pass through one or more clamp members 212A, 212B, 212C and terminate, for example, within first aperture 240. During operation, an electrolyte solution may be provided via conduit 226 to electrode head 208 by opening 222 while exposed (conductive) portion 220 machines turbine wheel 132 (FIG. 3). In the example shown, electrode 202 is substantially linear and electrode head 208 is substantially rounded. It is understood that electrode head 208 may have any shape desired to match the shape to be machined into turbine wheel 132 (FIG. 3). For example, electrode head 208 may be more or less rounded, squared off, pointed, etc., depending on the desired shape in turbine wheel 132 (FIG. 3). In the instant case, as shown in FIG. 3, slot 140 is to have a rounded surface so as to relieve stress amongst edges 136 and 138 (FIGS. 2 and 3), so electrode head 208 has a rounded configuration for rendering edge 140 smoother by ECM. Conductive body 216 may have a shape other than linear such as curved. In any event, electrode 208, via conductive body 216, is operatively coupled to ECM control 156 (FIG. 4), e.g., by a wire 228 and any necessary couplings 230 such as a conductive stud 232. In this fashion, wire 228 carries an electric charge from ECM control 156 (FIG. 4) to electrode 202.

As noted above, electrode mount 206 positions electrode head 208 such that electrode head 208 operatively engages a portion, e.g., edge 140 (FIG. 3), of selected dovetail slot 130M (FIG. 6) for electro-chemical machining of a portion of the slot. Electrode mount 206 may include any structure capable of positioning electrode head 208 relative to the portion of selected dovetail slot 130M. As understood in the art, an electrode head 208 of an ECM machine must be in close proximity to a workpiece such as a dovetail slot 130. In one example, electrode head 208 may be approximately 1-30 microns and is typically about 10 microns from edge 140, and charged negative as a cathode by wire 228 while turbine wheel 132 (FIGS. 2-3) is charged positive as an anode using a wire 230 (see FIG. 4). In one embodiment, as illustrated, electrode mount 206 may include a first aperture 240 (FIGS. 8 and 9) extending through a section of clamp 204. In the example shown, since edge 140 (FIG. 3) is close to a lowermost, root section 142 (FIGS. 3 and 6) of selected dovetail slot 130M, the section of clamp 204 includes a lowermost clamping member 212C. However, first aperture 240 may extend through any clamp member or members 212A-C. If necessary, and as illustrated, first aperture 240 may extend at an angle relative to a longitudinal axis of clamp 204, and consequently selected dovetail slot 130M, to position electrode head 208 at the desired position. The angle may be any angle necessary to place electrode head 208 in an appropriate position for ECM. As shown in FIG. 9, electrode mount 206 may further include a positioning member 242 coupled to an end of clamp 204. Positioning member 242 may include a second aperture 244 extending through the positioning member and substantially aligned with first aperture 240. Electrode 202 may extend through both apertures 240, 244. In this fashion, positioning member 242 may provide additional support of electrode 202. Positioning member 242 may be made of the same material as clamp 204, and may be coupled to clamp 204 in any fashion, e.g., adhesives, fasteners such as screws, etc.

Referring to FIGS. 7 and 8, as described, electrode head 208 may include opening 222 at an end thereof, which may be in fluid communication with electrolyte solution passage 224 extending through electrode 202, i.e., conductive body 216. As shown best in FIG. 8, in addition thereto or as an alternative, clamp 204 may also include an electrolyte solution passage 250 (shown in phantom) extending through the clamp and terminating adjacent to electrode head 208. In one example, passage 250 may terminate in first aperture 240. However, passage 250 may also terminate, for example, at any location capable of delivering the electrolyte solution to the machining location. For example, passage 250 could terminate at an outer surface of clamp member(s) 212A-C adjacent electrode head 208. Electrolyte solution passage 250 may be in fluid communication, via a conduit 252, with an electrolyte solution source 152 (FIG. 4) via ECM control 156 (FIG. 4).

As noted herein, electrode 202 may take the form of a cathode and turbine wheel 132 may be charged as an anode by ECM control 156 (FIG. 4). Accordingly, as shown in FIGS. 5 and 9, aspects of the invention may also include an ECM cathode 300 for a portion of selected dovetail slot 130M (FIG. 3) of turbine wheel 132 (FIG. 3) having a plurality of dovetail slots 130 (FIG. 3). In this case, ECM cathode 300 may include cathode 302 including cathode head 308. As described herein, clamp 204 may have a shape and size configured to selectively engage in at least a portion of the selected dovetail slot 130M (FIG. 6). Electrode mount 206 may act as a cathode mount to position cathode head 208 relative to clamp 204 such that the cathode head operatively engages the portion of the selected dovetail slot for electro-chemical machining of the portion.

In operation, ECM machine 150 is provided with controller 156 and fixture 200 configured for positioning electrode 202 for ECM. As shown in FIG. 6, fixture 200 is then positioned in selected dovetail slot 130M of plurality of dovetail slots 130 in turbine wheel 132, which is in-situ in turbomachine 100. That is, clamp 204 is slid into a selected dovetail slot 130M, as shown in FIG. 6. Adjustable members 210 are adjusted to securely fasten clamp 204 in selected dovetail slot 130M (FIG. 6). Clamp 204 and insulator 218 of electrode 202 insulate conductive body 216 such that only exposed portion 220 acts to provide electro-chemical machining. Electrode 202 may be positioned within first aperture 240 of electrode mount 206 or later inserted such that electrode head 208 is in close proximity to a portion of slot 130M such as edge 140 (FIG. 3). Positioning member 242 may be employed with electrode mount 206 or omitted if first aperture 240 provides sufficient support. FIG. 10 shows fixture 200, 300 in position within a selected dovetail slot 130M. An electrolyte solution is then applied between selected dovetail slot 130M and electrode 200, e.g., via conduit 226 (FIG. 7) to electrode head 208 (FIGS. 7, 8), or by conduit 252 (FIG. 8) and passage 250 (FIG. 8). That is, ECM control 156 acts to provide electrolyte solution by conduit(s) 226 (FIG. 7) and/or 252 (FIG. 8), e.g., by a pump. Electrolyte solution may be heated to any desired temperature and provided at a desired flow rate and pressure by ECM 156 in a known fashion. In operation, electrolyte solution is supplied to electrode head 208 by ECM control 156 at a specified, temperature, flow rate, pressure, etc.

As noted, electrode 202 includes a conductive body 216 that is electrically coupled to ECM control 156 (FIG. 4) by wire 228. Similarly, turbine wheel 132 is electrically coupled to ECM control 156 (FIG. 4) to act as an anode by wire 230 (FIG. 4). Material is removed from the portion of selected dovetail slot 130M by applying an electric potential to electrode 202 to create a potential gradient between electrode 202 and the portion of slot 130M. That is, electrode head 208 (cathode) and turbine wheel 132 (anode) are appropriately charged so that electrode head 208 electrochemically machines edge 140, radiusing it out and smoothing it. As illustrated, the ECM occurs within dovetail slot 130M and an operator cannot see the actual machining occurring, i.e., fixture 200 visually obstructs the ECM in the selected dovetail slot.

ECM according to embodiments of the invention may be performed after other initial machining such as milling, grinding and/or de-burring edge 140. Once one dovetail is completed, the fixture may be removed and positioned into another dovetail slot and the process repeated for each dovetail slot 130, as necessary. Fixture 200 (cathode 300) thus provide a portable mechanism to provide precise ECM to a portion of turbine wheel 132 in the field and in-situ. That is, turbine wheel 132 is not removed from turbomachine 100, thus reducing the costs of removing and transporting a turbine wheel for repair. Hence, fixture 200 (cathode 300) may be employed to remove a precise amount of material that is prone to cracking in a turbine wheel 132 (FIG. 3) in-situ, reducing the time and costs of removing turbine wheel 132 (FIGS. 2-3) from turbomachine 100 (FIG. 1). The surface finish may be mirror finish, e.g., having a surface roughness (Ra) of about 0.025-0.25 microns.

In addition, fixture 200 may be moved from site-to-site with ECM machine 150 (FIG. 5) in a portable manner, allowing use in a wide variety of locations. As noted herein, ECM machine 150 (FIG. 5) may be configured to be portable. For example, as shown in FIG. 11, all of the parts of ECM machine 150 may be configured and sized to be carried within a standard shipping container 400. Container 400 may include any conventional shipping container. Here, however, container 400 may include ECM machine 150 having electrolyte solution source 152 and electrolyte solution collector 154 for storing liquid electrolyte solution prior to and after machining. Source and collector 152, 154 may include any form of storage compartment, e.g., plastic or metal tanks, and may include any necessary heating, cooling and/or filtering systems for the electrolyte solution. ECM control 156 may also be provided to control electric charge supplied to ECM electrodes. As noted, ECM control 156 may include any now known or later developed electro-chemical machining control system, and may include touch panel controls 402. As understood in the art, ECM control 156 controls a number of attributes such as but not limited to: pump and heater functioning to control a flow rate, pressure, temperature, etc., of an electrolyte solution, the electric charge delivered to the electrodes, etc. Container 400 may include a removable floor 404 for system maintenance or shop applications, and may include any necessary external disconnect panel(s) 406 for quick connect field leads. In addition, container 400 may include any necessary climate controls, any necessary cable runs for placement of at least parts of ECM machine 150 outside of the container. In this manner, ECM machine 150 can be employed in the field and moved from location to location to service various turbomachines The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A method for electro-chemical machining (ECM), comprising:
    providing a turbine wheel with a plurality of dovetail slots and selecting a dovetail slot from the plurality of dovetail slots;
    providing an ECM machine including a fixture configured for positioning an electrode for ECM,
        wherein the fixture includes a clamp having a shape and size configured to selectively engage in at least a portion of the selected dovetail slot, the turbine wheel being positioned in-situ in a turbomachine; and an electrode mount for positioning the electrode relative to the clamp, the electrode mount including a first aperture extending through an axial outer surface of a section of the clamp;
    positioning the fixture in the selected dovetail slot wherein the positioning of the fixture in the selected dovetail slot includes: engaging an internal surface of the portion of the selected dovetail slot with the clamp to hold the electrode relative to the portion; positioning the electrode within the first aperture through the axial outer surface of the clamp; and engaging the portion of the selected dovetail slot with the electrode;
    applying an electrolyte solution between the selected dovetail slot and the electrode; and
    removing material from the portion of the selected dovetail slot by applying an electric potential to the electrode to create a potential gradient between the electrode and the portion of the selected dovetail slot.

2. The method of claim 1, further comprising:
    removing the fixture from the selected dovetail slot; and
    repeating the positioning, applying and the removing for each dovetail slot of the plurality of dovetail slots.

3. The method of claim 1, wherein the fixture visually obstructs the ECM in the selected dovetail slot.

4. The method of claim 1, wherein the portion of the selected dovetail slot includes an edge of a cooling slot within the selected dovetail slot.

5. The method of claim 1, wherein the electrode mount further includes a positioning member coupled to an end of the clamp, and further comprising:
    extending a second aperture of the electrode mount through the positioning member and substantially aligned with the first aperture.

6. The method of claim 1, wherein the first aperture extends at an angle relative to a longitudinal axis of the clamp.

7. The method of claim 1, wherein the electrode includes an electrode head having an opening at an end thereof.

8. The method of claim 7, wherein the electrode is substantially linear and the electrode head is substantially rounded.

9. The method of claim 7, wherein the clamp includes an electrolyte solution passage extending therethrough and terminating adjacent to the electrode head, and wherein the applying of the electrolyte solution between the selected dovetail slot and the electrode includes passing the electrolyte solution through the electrolyte solution passage.

10. The method of claim 1, wherein the clamp includes an adjustable member to allow selective securing and removal of the clamp from the selected dovetail slot.

11. The method of claim 10, wherein the clamp includes a plurality of longitudinal clamping members, and wherein the positioning of the fixture in the selected dovetail slot includes:
    using the adjustable member to adjustably displace at least one of the plurality of longitudinal clamping members radially relative to the selected dovetail slot to secure the clamp in the selected dovetail slot.

* * * * *